J. NEWMANN.

ROLLER BEARING.

APPLICATION FILED NOV. 14, 1913.

Reissued May 12, 1914. 13,727.

Witnesses:
M. E. Engelund
L. E. Johnston

John Newmann
Inventor

By Attorney
W. B. Morton

UNITED STATES PATENT OFFICE.

JOHN NEWMANN, OF BROOKLYN, NEW YORK, ASSIGNOR TO GLOBE ANTI-FRICTION ROLLER BEARING COMPANY, OF BROOKLYN, NEW YORK, A CORPORATION OF NEW YORK.

ROLLER-BEARING.

13,727. Specification of Reissued Letters Patent. Reissued May 12, 1914.

Original No. 1,001,673, dated August 29, 1911, Serial No. 603,226. Application for reissue filed November 14, 1913. Serial No. 800,931.

*To all whom it may concern:*

Be it known that I, JOHN NEWMANN, a citizen of the United States, residing in Brooklyn, county of Kings, and State of New York, have invented certain new and useful Improvements in Roller-Bearings, of which the following is a specification.

The present invention relates to roller bearings and has for its object to further improve such bearings with the view of more simplifying the same and of rendering the manufacture of such bearings cheaper.

With this object in view, my invention consists of the construction, arrangement and combination of parts as will hereinafter be more fully specified.

It will of course be understood however that my invention is not limited to the exact details of construction disclosed but covers all such modifications thereof as properly fall within the scope of the appended claims.

Figure 2:
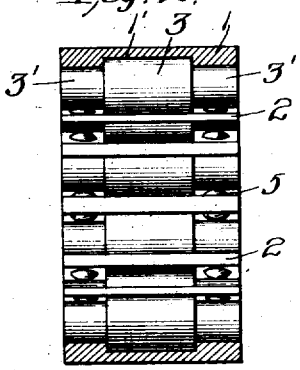
Figure 1:
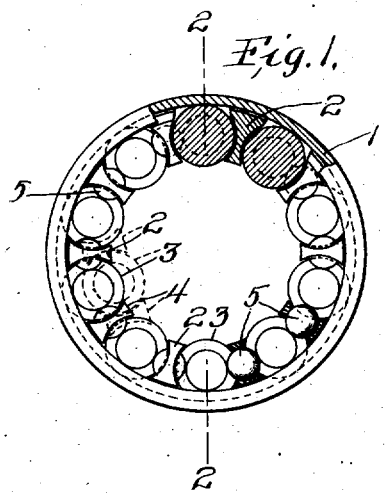
Figure 3:
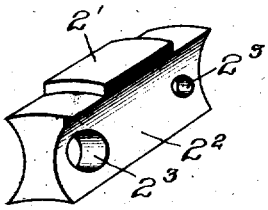
Figure 4:
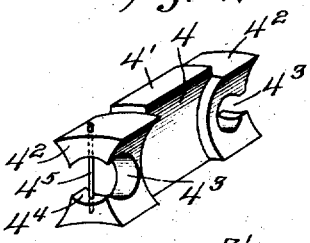
Figure 5:
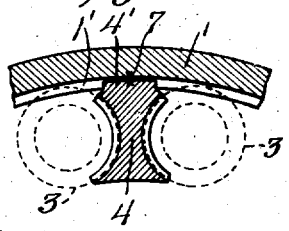
Figure 6:
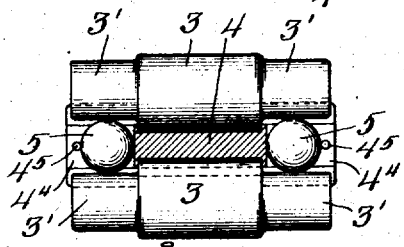
Figure 8:
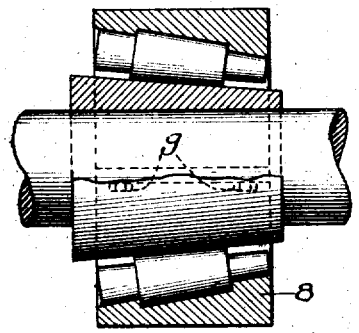
Figure 7:
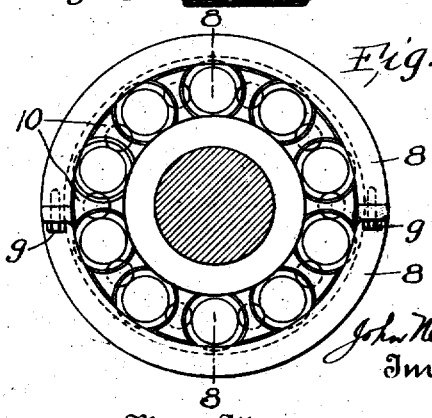

In the accompanying drawing, which forms a part of this specification, similar reference numerals denote corresponding parts and Figure 1 is an end view partly broken away; Fig. 2 is a longitudinal section on line 2—2 of Fig. 1 of a cylindrical roller bearing; Fig. 3 is a perspective view of one of the loose blocks interposed between the rollers; Fig. 4 is a perspective view of a loose end block; Fig. 5 is a partial cross section in enlarged view, showing the end block in position; Fig. 6 is a cross section through one of the loose blocks showing the position of the rollers and balls relative thereto and Figs. 7 and 8 are an end view and vertical section on line 8—8 of Fig. 7 respectively of a tapered roller bearing slightly modified in construction.

Roller bearings as generally constructed comprise an outer race or box, an inner race and a series of rollers interposed between the two races and held in properly spaced relation to each other by a suitable cage. In my prior Patents Nos. 934,621 and 969,763, I have disclosed typical bearings of this kind wherein the cages comprise rings at each end of the series of rollers provided with fingers projecting between the rollers and contain anti-friction balls engaging the rollers.

In my present invention I dispensed with the cages of my previous bearings and substituted therefor loose separators of novel design adapted when assembled in the outer race of the bearing to interlock with the rollers to maintain the rollers and separators against displacement and in alinement in the bearing race.

In the drawings I have disclosed both a cylindrical bearing and a tapered bearing. Describing first the cylindrical bearing 1 indicates the outer case, 2 the separators and 3 the rollers. The rollers 3 are provided with central enlarged bearing portions and with reduced ends 3′ and the race 1 is provided with a central recess or groove 1′ slightly wider than the bearing portions of the rollers and flanges at each end overlying the reduced ends of the rollers and slightly out of contact therewith. As shown the spacers 2 consist of blocks of about the same length as the rollers and having preferably shoulders 2′ on their outer faces adapted to lie in the groove 1′, but normally clear of engagement therewith. The side faces of the separators 2 and their shoulders are concaved as shown at $2^2$ to conform to the bearing portions of the rollers and at their ends opposite the reduced ends of the rollers are provided with cross bores $2^3$ for the reception of anti-friction balls 5 of a diameter sufficient to hold the middle portions of the rollers out of contact with the concave faces of the blocks 2.

One of the end blocks is slightly modified in construction from the others. Such end block 4, which also has an outer extension 4′ is reduced in thickness throughout the portion adjacent the enlarged part of the rollers so that the parts $4^2$ of the block which lie between the reduced ends of the rollers project from the concaved side surfaces of said central portion in form of shoulders. The end portions $4^2$ have cross bores $4^3$ as the other blocks, but in addition thereto bores $4^4$ made longitudinally of the blocks and terminating into said cross bores $4^3$. These longitudinal bores $4^4$ permit of the insertion of the balls into the cross bores of the last block after all the parts are assembled in the box, so as to finally lock them in position relative to one another. To prevent the slipping out of the balls from the cross bores $4^3$ through the bores $4^4$ pins $4^5$ or the like may be driven through said end bores $4^4$ to clog the same.

In assembled position, the outer surfaces of the extensions 2′ do not bear against the surface of the central annular groove 1′, as indicated at 7 (Fig. 5), allowing thus of sufficient play for said parts.

After all parts but the last roller and last block are assembled in the box or race 1, the last inserted block 2 is slightly drawn inward (as indicated by dotted lines in Fig. 1) then the last locking block 4 and last roller having been separately assembled are placed in position relative to this slightly displaced block 2 and all three members are forced into position through the still open space (as indicated by dotted lines in Fig. 1). Owing to the reduction in the thickness of the central portion of the last block, the placing into position of these last three members is facilitated. The balls are thereupon inserted through the end bores $4^4$ of said last block and the said bores clogged by the pins $4^5$ to prevent the slipping out of said balls. By the introduction of the balls into the last block, all the parts become efficiently inter-locked. The annular groove in the box prevents a lateral displacement of the blocks and rollers. The balls projecting sidewise from the blocks bear against the reduced ends of the rollers.

The same construction may be used for tapered roller bearings. However, in the example shown, the tapered bearing is shown as having a sectional box 8, *i. e.* a cage constructed of two halves, which in a suitable manner, as by bolts 9 or the like are secured to one another. When the box is made sectional for a cylindrical or tapered roller bearing, there is no necessity for a specially formed end block. In this case, all blocks 10 may be made of uniform shape and conforming to the blocks 2 in the first example, as the members can be first assembled in one and then in the other half of the box and the two halves then assembled and joined.

The advantages of my improved bearing will be largely obvious from the above description. The separate spacers greatly facilitate taking down and assembling the bearing for cleaning or repair and are also much cheaper to manufacture than the cages of my prior patents. The spacers assist in interlocking the parts when the inner race is withdrawn to prevent their falling out of the outer races but when the bearing is assembled and in operation they act merely as carriers for the balls to hold them in proper position so that the balls take all the wear from the rotating rollers while the rollers themselves receive the end thrust on the bearing. As the spacers have clearance in all directions they need not be accurately and expensively machined as is necessary with cages of ordinary construction.

Having thus described the nature of my invention what I claim and desire to secure by Letters Patent is:—

1. In a roller bearing of the character described, a box having on its inner circumference an annular groove, rollers, each having an enlarged portion bearing in said groove, loose perforated blocks interposed between said rollers, each block having an outer shoulder adapted to bear in said groove, the lateral surfaces of said blocks and the shoulders thereof being concaved, and balls in the perforations of said blocks projecting laterally outward and bearing against the reduced ends of said rollers.

2. In a roller bearing of the character described a block having cross bores and longitudinal bores terminating into the latter.

3. In a roller bearing of the character described, a sectional box having on its inner circumference an annular groove, rollers having enlarged portions bearing in said groove, loose blocks interposed between said rollers, each block having an outer shoulder bearing in said annular groove, the lateral surfaces of said blocks and the shoulder thereof being concaved, and balls in the perforations of said blocks projecting laterally outward and bearing against the reduced portions of said rollers.

4. In a roller bearing, the combination of two members constituting outer and inner races, a series of rollers interposed between said races, a series of loose spacers interposed between said rollers, said spacers having a plurality of balls mounted therein and engaging said rollers at different points of their length, said spacers also having extensions along their longitudinal edges overlying the convex faces of the adjacent rollers.

5. In a roller bearing, the combination of two members constituting outer and inner races, a series of rollers interposed between said races, said rollers having portions of reduced diameter and a series of loose spacers interposed between said rollers, said spacers having a plurality of balls mounted therein and engaging the reduced portions of said rollers, said spacers also having extensions along their longitudinal edges overlying the convex faces of the adjacent rollers.

6. In a roller bearing, the combination of two members constituting inner and outer races, said outer race having a central annular depression, a series of rollers, interposed between said races, said rollers being of reduced diameter at their ends, the central enlarged portion of said rollers forming the load-carrying portion thereof and engaging the surface of said depression and the inner race, loose spacers interposed between said rollers, said spacers having balls mounted therein and lying between the reduced ends of the adjacent rollers.

7. In a roller bearing, the combination of two members constituting inner and outer races, said outer race having a central annular groove or depression, a series of rollers interposed between said races, said rollers having central enlarged portions bearing in said groove and loose spacers interposed between said rollers, each spacer having a pair of balls mounted therein and lying between the ends of the adjacent rollers beyond their central enlarged portions.

8. In a roller bearing, the combination of two members constituting inner and outer races, a series of rollers interposed between said races, loose spacers between said rollers, said spacers having balls mounted therein and engaging the adjacent rollers, and having extensions on their edges embracing the convex faces of the adjacent rollers, the sum of the diameters of said balls and rollers bearing such relation to the diameter of the outer race that the rollers and spacers when assembled in the outer race are interlocked and sustained against inward radial displacement.

Signed at New York in the county of New York and State of New York, this 3rd day of November, 1913.

JOHN NEWMANN.

Witnesses:
W. B. MORTON,
ENT. P. KOVEN.

Copies of this patent may be obtained for five cents each, by addressing the "Commissioner of Patents, Washington, D. C."